M. H. MALONEY.
SPINNING RING AND HOLDER THEREFOR.
APPLICATION FILED DEC. 21, 1908.

1,053,416.

Patented Feb. 18, 1913.

WITNESSES:
M. E. Flaherty.
W. P. O'Brien.

INVENTOR:
Michael H. Maloney
by his attys
Clarke Raymond & Cole

UNITED STATES PATENT OFFICE.

MICHAEL H. MALONEY, OF PLYMOUTH, MASSACHUSETTS.

SPINNING-RING AND HOLDER THEREFOR.

1,053,416.  Specification of Letters Patent.  Patented Feb. 18, 1913.

Application filed December 21, 1908. Serial No. 468,430.

*To all whom it may concern:*

Be it known that I, MICHAEL H. MALONEY, of Plymouth, in the county of Plymouth and State of Massachusetts, a citizen of the United States, have invented a new and useful Improvement in Spinning-Rings and Holders Therefor, of which the following is a full, clear, and exact description, reference being had to the accompanying drawings, forming a part of this specification, in explaining its nature.

My invention relates generally to an improved type of spinning mechanism comprising in part a rotary ring.

More specifically my invention relates to a means whereby the ordinary two-flanged stationary ring may be converted into a rotary ring.

Owing to the shape of the flanges of the standard two-flanged stationary ring it is practically impossible to rotate this ring in bearings without destroying the bearings to say nothing of injuring the flange of the ring and so destroying its value as a two-flanged ring, or in other words, a ring on either end of which the traveler could be used simply by inverting the ring. Moreover owing to the fact that the ordinary two-flanged rings are commonly irregular in construction, not being made to operate as rotatable rings and owing, also, to the incident of wear in the case of old rings, the ordinary stationary two-flanged rings could not well be set in bearings and operate as rotatable rings without an auxiliary mechanism or part.

It is accordingly the object of my invention to provide the rings in question with an auxiliary part or bearing ring by means of which the two-flanged ring though irregular in form or worn, may be properly centered to operate as a rotary ring and possess peculiar advantages to which reference will hereinafter be made.

It is the further object of my invention to provide an improved form of holder or base to which the rotary ring comprising my invention is especially applicable, this base also possessing further peculiar advantages to which reference will hereinafter be made.

My invention can best be seen and understood by reference to the drawings, in which—

Figure 1:
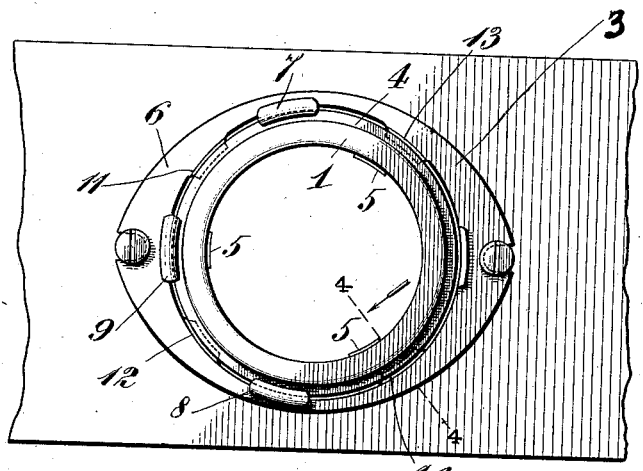
Figure 2:
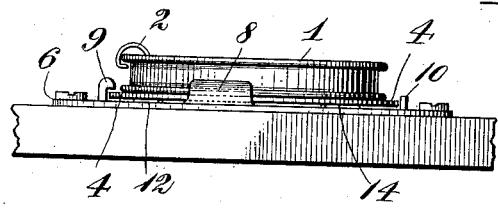
Figure 3:
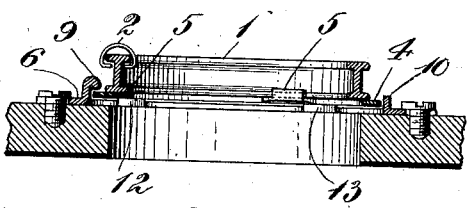
Figures 4, 7:
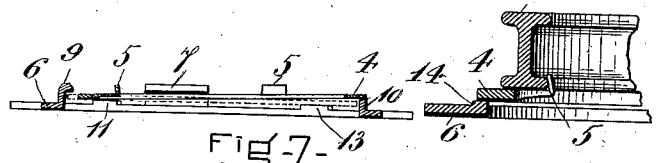
Figure 5:
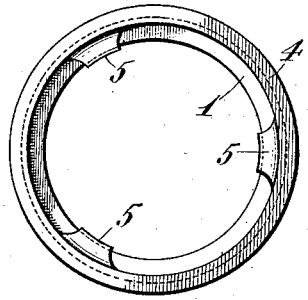
Figure 6:
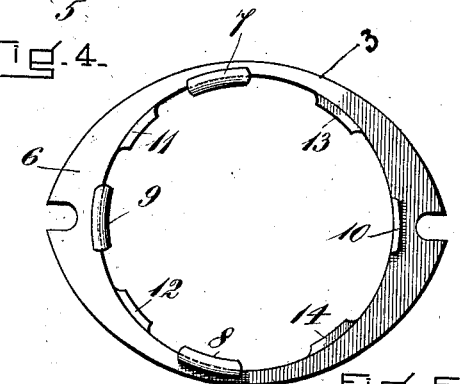

Figure 1 shows a plan of a device comprising my invention. Fig. 2 shows the same in side elevation. Fig. 3 shows the same in vertical section. Fig. 4 is a section taken on the line 4—4 of Fig. 1. Fig. 5 is a plan of the under side of the bearing ring to which reference will hereinafter be made. Fig. 6 is a plan of the base portion of the device. Fig. 7 is a vertical section of the ring and base showing the manner in which it is applied to the base which will be hereinafter described.

1 represents a common form of double-flanged traveler ring of the kind formerly employed as a stationary ring.

2 represents the traveler.

3 is a base or holder to which reference will hereinafter be made.

4 is a bearing ring to which the traveler ring is fixedly secured and which coöperates with the base to rotate thereon as will hereinafter be explained.

In form the bearing ring 4 is annular, the same being preferably punched or stamped out from sheet metal and ground true. In size the bearing ring is slightly wider than the traveler ring so that when affixed to the traveler ring it will extend outwardly therefrom, forming as it were an annular flange extending from the bottom end of the traveler ring or that end to which the bearing ring is secured.

The bearing ring is secured to the traveler ring by means of separate clips 5. The interior diameter of the bearing ring is greater than the interior diameter of the flange-forming bottom end of the traveler ring so that the bottom end of the traveler ring will rest only in part upon the bearing ring around the inner edge thereof. The separate clips 5 extend inwardly from the inner edge of the bearing ring beneath the under side of that portion of the bottom end of the traveler ring not resting upon the bearing ring and thence upwardly and around the bottom inside edge or flange of the traveler ring to engage the same by which means the two rings become secured to one another.

The advantage of constructing the bearing ring to coöperate with the traveler ring in the manner above described is that by reason of the relative disposition of the bearing ring, extending as it does outwardly from the traveler ring, the bearing ring owing to the elasticity of its metal will yield slightly even though it may be fixedly secured to the traveler ring and so assist in affixing the ring to the base, as will afterward be explained. A further advantage resides, also, in the fact that the inwardly extending clips 5, extending as they do inwardly from the bearing ring and over a portion of the bottom edge of the traveler ring, may be turned up for properly centering the traveler ring on the bearing ring though there may be considerable irregularity in the form of the traveler ring. In this connection it will be understood that the bearing ring is ground to comprise as true or perfect an annular ring as possible and it is desirable to so center the traveler ring thereon that the normal axial center of the traveler ring, though irregular in form, will coincide with the axial center of the bearing ring. Such relationship between the rings may be obtained by fixedly holding the bearing ring and then turning up the clips 5 and forcing them outwardly, each the same distance from the axial center of the bearing ring, until the clips fixedly engage the traveler ring when the rings will be maintained in proper relationship to one another. It is my practice to bend up the ends of the clips before the application of the traveler ring to the bearing ring, the clips being turned up each the same distance from the axial center of the bearing ring. Afterward the traveler ring is applied to the bearing ring outside the upturned clips or flanges which act to approximately center it. Afterward each of the clips is pressed outwardly to engage the traveler ring when the two rings become affixed to one another in the manner before described.

With reference to the base or holder 3 furnishing a support and bearing for the bearing ring: The base comprises a bottom or seating plate 6 adapted to become affixed to any suitable fixture or support. Rising from the base and circumferentially arranged are a series of separate clips and bearings, of which 7, 8, 9 and 10 represent the respective clips and 11, 12, 13 and 14 the bearings. In their order of arrangement the several clips and bearings are preferably separate unopposing one another; in other words, the faces of those portions of the clips retaining the bearing ring are unopposed to the faces of the bearings on which the bearing ring is resting. There is also this further peculiarity in the arrangement of the clips and bearings: Of the clips those numbered 7, 8 and 9 are arranged to hold or support the bearing ring from only one diametrical side of the base, the clip 7 being arranged to hold the bearing ring from the extremity of said side and the clips 8 and 9 being arranged preferably to engage the bearing ring from a point just adjacent to the diametrical edge of said side but not so as to overlap said edge. As for the clip 10, this clip is arranged to hold the bearing ring from the extremity of the other diametrical side of the base, and it is to be observed that this clip has no part which overhangs the bearing ring, but acts only to hold the bearing ring from lateral displacement when the ring is in place. As for the bearings it will be observed that the bearings 11 and 12 are arranged to support the bearing ring at points between the clips 8 and 9 and the bearings 13 and 14 are arranged, respectively, between the clips 8—9 and the clip 10 on the other diametrical side of the base (see Fig. 6).

Now it will be observed by reference to Figs. 6 and 7, with the clips and bearings thus arranged, that the bearing ring may be laterally applied to the base by inserting the ring in the space between the clips 7—8 and the respective adjacent bearings 11—12, when by the application of a slight pressure the bearing ring may be moved approximately close to the clip 9, the ring then occupying a slightly inclined position with one end or side thereof resting upon the top surface of the clip 10 on the other side of the base. Now upon the application of further pressure the bearing ring may be cramped in to slip over the clip 10 and become socketed between the clips and bearings. This last movement for seating the bearing ring is occasioned not only by reason of the force applied but in no slight measure by the flexibility inherent in the metal of the bearing ring, this ring as before described being made to possess a certain flexibility and to combine with the traveler ring in such manner that such flexibility might not be eliminated. The bearing ring thus seated will be retained by the clips to freely rotate on the respective bearings in the operation of the device without danger of displacement. When, however, it is desired to remove the ring from the base it may be removed simply by reversing the operation above described. In other words, the ring may be cramped up over the clip 10 and thence drawn out laterally from the base.

In respect to the method of making the base, it is apparent that inasmuch as the respective clips and bearings are preferably integral with the base, the entire base may be struck up from a single blank of sheet metal plate or the base may be molded as is desired.

Having thus fully described my invention, I claim and desire to secure by Letters Patent of the United States:—

1. In a device of the character specified, the combination of a traveler ring, a bearing ring wider than said traveler ring and having also an interior diameter greater than the interior diameter of the bottom flange-forming end of said traveler ring whereby said traveler ring may rest only in part upon said bearing ring around the inside edge thereof, separate clips extending from the inside edge of said bearing ring beneath that portion of said traveler ring not resting upon said bearing ring and thence turned up at approximately the same distance removed from the axial center of said bearing ring to embrace the bottom inside flanged edge of said traveler ring, binding the two rings together, and a base on which said bearing ring is mounted to rotate.

2. In a device of the character specified, the combination of a rotary ring and a base upon which said ring is mounted to rotate, said base having a series of clips and bearings separate and unopposed to one another and annularly arranged, all of said clips loosely embracing said ring around the peripheral edge thereof for retaining the same as against displacement in a lateral direction, a plurality of said clips on one diametrical side of said base being provided with portions overhanging said ring by which the same is retained against displacement in an axial direction and other of said clips on the other diametrical side of said base having no overhanging portion, substantially as and for the purposes set forth.

3. In a device of the character specified, the combination of a traveler ring, a bearing ring, and a base upon which said bearing ring is mounted to rotate, said base having a series of clips and bearings separate and unopposed to one another and annularly arranged, all of said clips loosely embracing said bearing ring around the peripheral edge thereof for retaining the same as against displacement in a lateral direction, a plurality of said clips on one diametrical side of said base being provided with portions overhanging said bearing ring by which the same is retained against displacement in an axial direction, and other of said clips on the other diametrical side of said base having no overhanging portion, substantially as and for the purposes set forth.

MICHAEL H. MALONEY.

Witnesses:
  JOHN E. R. HAYES,
  M. E. FLAHERTY.

---

Copies of this patent may be obtained for five cents each, by addressing the "Commissioner of Patents, Washington, D. C."